(12) United States Patent
Xie

(10) Patent No.: US 11,805,586 B1
(45) Date of Patent: Oct. 31, 2023

(54) DECORATIVE LIGHTING DIMMER SWITCH WITHOUT INFLUENCING CHARGING

(71) Applicant: Ping Xie, Chenzhou (CN)

(72) Inventor: Ping Xie, Chenzhou (CN)

(73) Assignee: Xie Ping, Chenzhou (CN)

( * ) Notice: Subject to any disclaimer, the term of this patent is extended or adjusted under 35 U.S.C. 154(b) by 0 days.

(21) Appl. No.: 17/890,300

(22) Filed: Aug. 18, 2022

(30) Foreign Application Priority Data

Jun. 1, 2022 (CN) .......................... 202210617871.2

(51) Int. Cl.
 *H05B 45/30* (2020.01)
 *H05B 45/345* (2020.01)
 *H05B 45/34* (2020.01)
(52) U.S. Cl.
 CPC ........... *H05B 45/345* (2020.01); *H05B 45/34* (2020.01)
(58) Field of Classification Search
 CPC .... H05B 45/38; H05B 45/355; H05B 45/357; H05B 45/375; H05B 45/395; H05B 45/3725; H05B 45/345
 See application file for complete search history.

(56) References Cited

U.S. PATENT DOCUMENTS

| | | | | |
|---|---|---|---|---|
| 8,531,127 | B2* | 9/2013 | Smith | H05B 45/12 315/291 |
| 8,823,266 | B2* | 9/2014 | Qin | H05B 45/3725 315/120 |
| 2007/0222399 | A1* | 9/2007 | Bondy | F21S 2/00 315/291 |
| 2011/0068704 | A1* | 3/2011 | McKinney | H05B 45/355 315/210 |
| 2011/0084623 | A1* | 4/2011 | Barrow | H05B 45/10 315/250 |
| 2018/0368223 | A1* | 12/2018 | Johnson | H05B 45/00 |
| 2019/0098721 | A1* | 3/2019 | Udavant | H05B 47/19 |

* cited by examiner

*Primary Examiner* — Tung X Le
(74) *Attorney, Agent, or Firm* — PORUS IP LLC

(57) ABSTRACT

A decorative lighting dimmer switch without influencing charging is provided. The decorative lighting dimmer switch includes a charging module used for providing 12V direct current, wherein the charging module is connected to a charging interface of a light emitting diode (LED) lamp. The decorative lighting dimmer switch further includes a constant current source driving module connected to the charging module, wherein the constant current source driving module is connected to the LED lamp, and the constant current source driving module is a constant current source driving circuit including a PT4115 driving chip. The decorative lighting dimmer switch achieves a charging function and an on-line dimming function at a same time by arranging the constant current source driving module to drive the LED lamp to satisfy requirements of consumers.

7 Claims, 1 Drawing Sheet

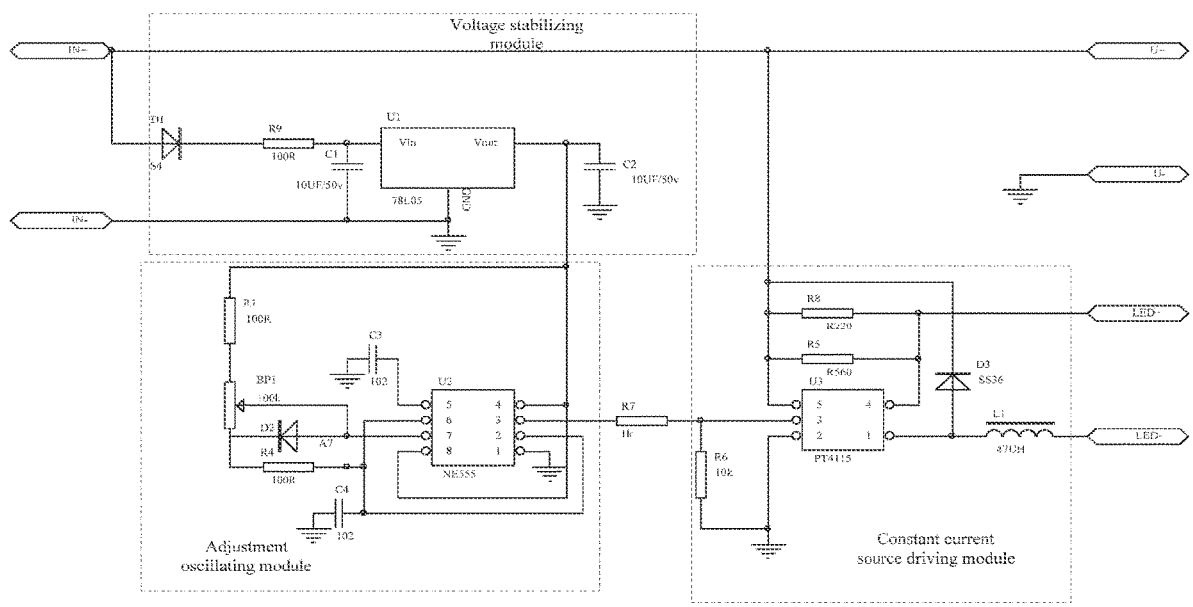

DECORATIVE LIGHTING DIMMER SWITCH WITHOUT INFLUENCING CHARGING

CROSS REFERENCE TO THE RELATED APPLICATIONS

This application is based upon and claims priority to Chinese Patent Application No. 202210617871.2, filed on Jun. 1, 2020, the entire contents of which are incorporated herein by reference.

TECHNICAL FIELD

The present disclosure relates to the technical field of decorative lighting dimming, and in particular to a decorative lighting dimmer switch without influencing charging.

BACKGROUND

With the increasing popularity of light emitting diode (LED) lamps, the requirements for the functions of LED lamps are becoming increasingly more diverse, especially the charging functional lamps having universal serial bus (USB) or type C are becoming increasingly more popular among consumers. How to solve the problem that the charging function and the dimming function of the light source do not influence each other has become a major problem to be solved in the decorative lighting design and production, that is, the dimming of the light source does not influence the charging of the USB or type C.

In order to solve this problem in the market, a dimmer switch is usually mounted on the lamp body. However, this arrangement cannot satisfy the requirements of on-line switch enthusiasts. As for the LED on-line dimmer switch currently available in the market, as long as the light source is turned off, the charging function cannot be achieved, or the LED on-line dimmer can only be charged under the condition that the light source is turned on (which is not conducive to environmental protection and energy conservation). Therefore, if the on-line dimming switch function is selected, the charging function can only be sacrificed (the charging function and the LED lighting function cannot exist at the same time, but the dimming can only be carried out when the lighting function is available, so when the dimming function is selected, the charging function must not be selected), bringing great inconvenience to customers and consumers.

SUMMARY

The objective of the present disclosure is to provide a decorative lighting dimmer switch without influencing charging, which may achieve a charging function and an on-line dimming function at the same time by arranging a constant current source driving module to drive a light emitting diode (LED) lamp, thereby satisfying requirements of consumers.

In order to achieve the above objective, the present disclosure provides a decorative lighting dimmer switch without influencing charging. The decorative lighting dimmer includes a charging module used for providing 12V direct current, where the charging module is connected to a charging interface of an LED lamp; and the present disclosure further includes a constant current source driving module connected to the charging module, where the constant current source driving module is connected to the LED lamp, and is a constant current source driving circuit including a PT4115 driving chip.

Preferably, a voltage stabilizing module and an adjustment oscillating module are further sequentially connected in series between the charging module and the constant current source driving module.

Preferably, the voltage stabilizing module is a voltage stabilizing circuit including a 78L05 linear voltage stabilizer; and the adjustment oscillating module is an adjustment oscillating circuit including an NE555 time sequence chip.

Preferably, a pin Vin of the 78L05 linear voltage stabilizer sequentially passes through a current-limiting resistor and a voltage stabilizing diode and is connected to a 12V positive electrode output end of the charging module, a pin GND of the 78L05 linear voltage stabilizer is grounded and is connected to a 12V negative electrode output end of the charging module, and a pin Vout of the 78L05 linear voltage stabilizer is connected to the adjustment oscillating module.

Preferably, a pin 4 and a pin 8 of the NE555 time sequence chip are connected to the pin Vout of the 78L05 linear voltage stabilizer, a pin 7 of the NE555 time sequence chip is in feedback connection between the pin Vout of the 78L05 linear voltage stabilizer and the pin 4 of the NE555 time sequence chip sequentially through a protection diode, an adjusting resistor and a feedback resistor, and a pin 3 of the NE555 time sequence chip is connected to the constant current source driving module through a protection resistor.

Preferably, a pin 3 of the PT4115 driving chip is connected to the pin 3 of the NE555 time sequence chip, and a pin 1 and a pin 4 of the PT4115 driving chip are connected to a negative electrode input end and a positive electrode input end of the LED lamp respectively.

Preferably, a filter inductor is further connected in series between the pin 1 of the PT4115 driving chip and the negative electrode input end of the LED lamp.

Preferably, a pin 5 of the PT4115 driving chip is connected between the 12V positive electrode output end of the charging module and a positive electrode charging interface of the LED lamp, one end of a clamping diode is further connected between the pin 1 of the PT4115 driving chip and the filter inductor, and the other end of the clamping diode is connected between a pin 5 of the PT4115 driving chip and the positive electrode charging interface of the LED lamp.

Preferably, the pin 5 of the PT4115 driving chip is further connected between the pin 4 of the PT4115 driving chip and the positive electrode input end of the LED lamp through a shunt resistor.

Preferably, the clamping diode is an SS36 Schottky diode.

Therefore, the present disclosure uses the decorative lighting dimmer switch without influencing charging, which has the above structure, and may achieve a charging function and an on-line dimming function at the same time by arranging the constant current source driving module to drive the LED lamp, thereby satisfying requirements of consumers.

The technical solution of the present disclosure will be further described in detail below by means of the drawings and the embodiments.

BRIEF DESCRIPTION OF THE DRAWINGS

FIG. 1 is a schematic diagram of a decorative lighting dimmer switch without influencing charging of an embodiment of the present disclosure.

DETAILED DESCRIPTION OF THE EMBODIMENTS

The present disclosure will be described in detail below in combination with the drawings. It should be noted that the embodiment provides detailed implementations and specific operation processes on the premise of the technical solution, but the scope of protection of the present disclosure is not limited to the embodiment.

FIG. 1 is a schematic diagram of a decorative lighting dimmer switch without influencing charging of an embodiment of the present disclosure. As shown in FIG. 1, the present disclosure structurally includes a charging module used for providing 12V direct current, where the charging module is connected to a charging interface of a light emitting diode (LED) lamp; and the present disclosure further includes a constant current source driving module connected to the charging module, where the constant current source driving module is connected to the LED lamp, and is a constant current source driving circuit including a PT4115 driving chip.

Preferably, a voltage stabilizing module and an adjustment oscillating module are further sequentially connected in series between the charging module and the constant current source driving module.

The voltage stabilizing module is a voltage stabilizing circuit including a 78L05 linear voltage stabilizer; and the adjustment oscillating module is an adjustment oscillating circuit including an NE555 time sequence chip.

Specifically, a pin Vin of the 78L05 linear voltage stabilizer sequentially passes through a current-limiting resistor R9 and a voltage stabilizing diode D1 and is connected to a 12V positive electrode output end of the charging module, a pin GND of the 78L05 linear voltage stabilizer is grounded and is connected to a 12V negative electrode output end of the charging module, and a pin Vout of the 78L05 linear voltage stabilizer is connected to the adjustment oscillating module.

Preferably, a pin 4 and a pin 8 of the NE555 time sequence chip are connected to the pin Vout of the 78L05 linear voltage stabilizer, a pin 7 of the NE555 time sequence chip is in feedback connection between the pin Vout of the 78L05 linear voltage stabilizer and the pin 4 of the NE555 time sequence chip sequentially through a protection diode D2, an adjusting resistor BP1 and a feedback resistor R1, and a pin 3 of the NE555 time sequence chip is connected to the constant current source driving module through a protection resistor.

Preferably, a pin 3 of the PT4115 driving chip is connected to the pin 3 of the NE555 time sequence chip, and a pin 1 and a pin 4 of the PT4115 driving chip are connected to a negative electrode input end and a positive electrode input end of the LED lamp respectively.

Preferably, a filter inductor L1 is further connected in series between the pin 1 of the PT4115 driving chip and the negative electrode input end of the LED lamp.

Preferably, a pin 5 of the PT4115 driving chip is connected between the 12V positive electrode output end of the charging module and a positive electrode charging interface of the LED lamp, one end of a clamping diode D3 is further connected between the pin 1 of the PT4115 driving chip and the filter inductor, and the other end of the clamping diode D3 is connected between a pin 5 of the PT4115 driving chip and the positive electrode charging interface of the LED lamp.

Preferably, the pin 5 of the PT4115 driving chip is further connected between the pin 4 of the PT4115 driving chip and the positive electrode input end of the LED lamp through a shunt resistor.

Preferably, the clamping diode D3 is an SS36 Schottky diode.

A working flow is as follows: during charging, the charging module directly matches the charging interface of the LED lamp for charging, at the same time, during dimming, the pin 3 of the adjustment oscillating circuit adjusts output, and then the constant current source driving circuit adjusts brightness of the LED lamp on-line while charging is carried out.

Therefore, the present disclosure uses the decorative lighting dimmer switch without influencing charging, which has the above structure, and may achieve a charging function and an on-line dimming function at the same time by arranging the constant current source driving module to drive the LED lamp, thereby satisfying requirements of consumers.

Finally, it should be noted that the above embodiment is merely used to describe the technical solution of the present disclosure, rather than limiting the same. Although the present disclosure has been described in detail with reference to the preferred embodiments, those of ordinary skill in the art should understand that the technical solution of the present disclosure may still be modified, or equivalently replaced. However, these modifications or equivalent replacements do not make the modified technical solution deviate from the spirit and scope of the technical solution of the present disclosure.

What is claimed is:

1. A decorative lighting dimmer switch without influencing charging, comprising a charging module used for providing 12V direct current, wherein the charging module is connected to a charging interface of a light emitting diode (LED) lamp, and the decorative lighting dimmer switch further comprises a constant current source driving module connected to the charging module, wherein the constant current source driving module is connected to the LED lamp, and the constant current source driving module is a constant current source driving a circuit comprising a driving chip, wherein a voltage stabilizing module and an adjustment oscillating module are sequentially connected in series between the charging module and the constant current source driving module, wherein the voltage stabilizing module is a voltage stabilizing circuit comprising a linear voltage stabilizer and the adjustment oscillating module is an adjustment oscillating circuit comprising an time sequence chip, and wherein a pin Vin of the linear voltage stabilizer sequentially passes through a current-limiting resistor and a voltage stabilizing diode and the pin Yin of the linear voltage stabilizer is connected to a 12V positive electrode output end of the charging; module, a pin GND of the linear voltage stabilizer is grounded and the pin GND of the linear voltage stabilizer is connected to a 12V negative electrode output end of the charging module, and a pin Vout of the linear voltage stabilizer is connected to the adjustment oscillating module.

2. The decorative lighting dimmer switch according to claim 1, wherein a pin 4 and a pin 8 of the time sequence chip are connected to the pin Vout of the linear voltage stabilizer, a pin 7 of the time sequence chip is in a feedback connection between the pin Vout of the linear voltage stabilizer and the pin 4 of the time sequence chip sequentially through a protection diode, an adjusting resistor and a feedback resistor, and a pin 3 of the time sequence chip is connected to the constant current source driving module through a protection resistor.

3. The decorative lighting dimmer switch according to claim 2, wherein a pin 3 of the driving chip is connected to the pin 3 of the time sequence chip, and a pin 1 and a pin 4 of the driving chip are connected to a negative electrode input end and a positive electrode input end of the LED lamp respectively.

4. The decorative lighting dimmer switch according to claim 3, wherein a filter inductor is connected in series between the pin 1 of the driving chip and the negative electrode input end of the LED lamp.

5. The decorative lighting dimmer switch according to claim 4, wherein a pin 5 of the driving chip is connected between the 12V positive electrode output end of the charging module and a positive electrode charging interface of the LED lamp, a first end of a clamping diode is connected between the pin 1 of the driving chip and the filter inductor, and a second end of the clamping diode is connected between the pin 5 of the driving chip and the positive electrode charging interface of the LED lamp.

6. The decorative lighting dimmer switch according to claim 5, wherein the pin 5 of the driving chip is connected between the pin 4 of the driving chip and the positive electrode input end of the LED lamp through a shunt resistor.

7. The decorative lighting dimmer switch according to claim 5, wherein the clamping diode is an Schottky diode.

\* \* \* \* \*